United States Patent [19]
Nalepka

[11] 3,803,743
[45] Apr. 16, 1974

[54] MINNOW DIPPER
[76] Inventor: Walter H. Nalepka, 33648 Michele St., Livonia, Mich. 48150
[22] Filed: June 16, 1972
[21] Appl. No.: 263,666

[52] U.S. Cl. .................................................. 43/4
[51] Int. Cl. ............................................ A01k 69/00
[58] Field of Search ...................................... 43/4

[56] References Cited
UNITED STATES PATENTS
2,611,982  9/1952  Sears .......................................... 43/4
2,982,045  5/1961  Highland ..................................... 43/4
3,065,561  11/1962  Swanson ..................................... 43/4
2,531,551  11/1950  Brecht et al. ............................... 43/4
2,883,783  4/1959  Del Matter .................................. 43/4

Primary Examiner—Louis G. Mancene
Assistant Examiner—Robert F. Cutting
Attorney, Agent, or Firm—Charles W. Chandler

[57] ABSTRACT

A minnow dipper having a net for removing a minnow from a container and a holder carried by the net for supporting the minnow such that it can be manipulated by the user for attachment to a hook.

4 Claims, 4 Drawing Figures

PATENTED APR 16 1974  3,803,743

MINNOW DIPPER

BACKGROUND OF THE INVENTION

This invention relates to minnow dippers, and more particularly to a net for removing a minnow from a container for attachment to a hook without the minnow contacting the user's hands.

Many minnow dipping devices have been disclosed in prior art for removing a minnow from a container for positioning in a holder which supports the minnow for attachment to a hook. Usually an object of such devices is to support the minnow without damaging it for bait purposes, and to reduce the risk of the minnow slipping from the user's grip. Examples of such dippers are to be found in U.S. Pat. Ser. Nos. 2,502,816 to J. Bennek, Ser. No. 2,531,551 to R. Brecht et al., and Ser. No. 2,611,982 to J. Sears.

SUMMARY OF THE INVENTION

The broad purpose of the present invention is to provide a minnow dipper having a holder carried by a net so as to position the minnow in the holder as it is being removed from the minnow container. The holder is then manipulated through the net opening to a position in which the user can attach the hook to the minnow.

The preferred embodiment of the invention, which will be described in greater detail, employs a holder formed of a pair of elongated cooperating jaws having a series of opposed slots. The jaws are open as the minnow is received in the net. The user closes the jaws on the minnow to position it between a pair of slots aligned on opposite sides of the minnow's body. The user can then attach the minnow to a hook by passing it through the slots.

One advantage of the preferred minnow dipper is that it is composed of a minimum number of components that can be readily collapsed for storage. Another advantage is that it can be easily manipulated by the user.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
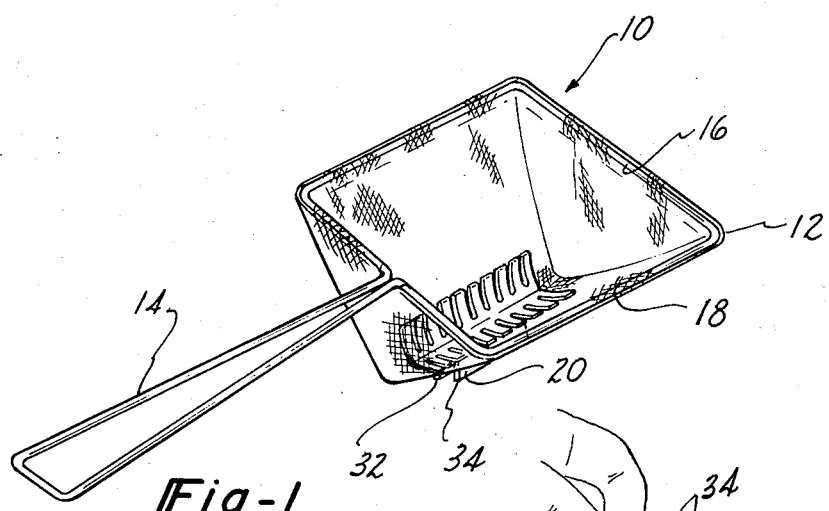
FIG. 1 is a perspective view of a minnow dipper illustrating the preferred embodiment of the invention with the holder in the bottom of the net.

Referring to the drawing, a preferred minnow dipper 10 includes a support 12 having an elongated handle 14 and an opening 16. The support 12 is preferably formed of a rust-proof material such as plastic, however, it can also be formed of wire and the like.

A net 18 is attached to support 12 about opening 16. Net 18 is formed of a mesh appropriate for containing a minnow as dipper 10 is inserted in an appropriate container (not shown) for removing a minnow from water in the container. A holder 20 is attached to net 18 and has a pair of operating jaws 22 and 24 disposed in the position illustrated in FIG. 1, to receive a minnow passing through opening 16.

Figure 3:
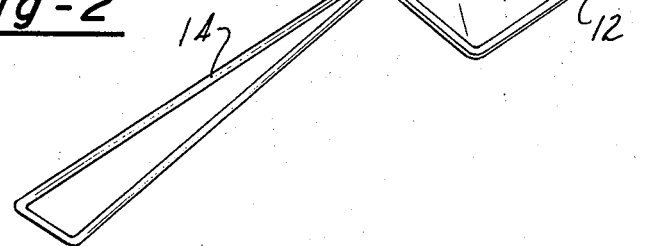
FIG. 3 is a view of the holder separated from the net for descriptive purposes, and in its open position for receiving a minnow.
Figure 4:
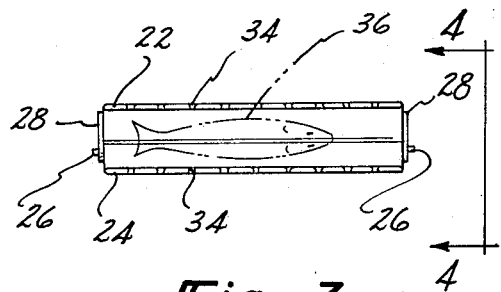
FIG. 4 is a view as seen along lines 4—4 of FIG. 3.
Figure 4:
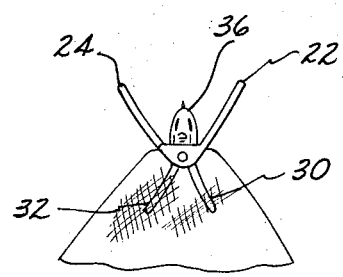

As best shown in FIG. 3, jaw 24 has a pair of pins 26 journaled in a pair of walls 28 carried by jaw 22 such that the two jaws can be moved between open and closed positions. As best shown in FIG. 4, a tab 30 is carried by jaw 22, and a similar tab 32 is carried by jaw 24 such that the user can pivot the two jaws between their open and closed positions. A spring member not shown, could be mounted on the jaws to bias them toward their closed positions.

Figure 2:
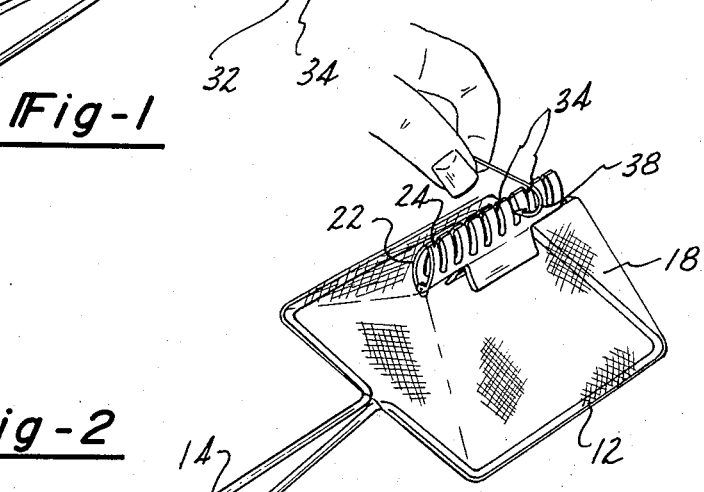
FIG. 2 is a view of the preferred dipper showing the holder passed through the net opening to position the minnow for attachment to the hook.

Jaws 22 and 24 are each elongated, and have a series of slots 34 in aligned jaws. As illustrated in FIGS. 1 and 4, the jaws are disposed in the bottom of the net in their open position for receiving a minnow 36 between the two jaws. The user closes the holder to engage the minnow between the two jaws. He then passes the holder with the minnow through support opening 16 to a position outside of the net, as illustrated in FIG. 2. A conventional fish hook 38 is attached to the minnow by passing the point of the hook through a selected pair of slots 34.

Jaws 22 and 24 each have a concave inner surface for engaging the minnow such that he cannot wiggle out of the user's grip during the hooking operation. The holder 20 is preferably formed of an appropriate non-rusting material such as a lightweight plastic.

It is to be understood that I have described a novel minnow dipper composed of a relatively few components that can be inexpensively fabricated and assembled, and collapsed into a relatively small volume for storage so as to function as a useful accessory for a fisherman.

Having described my invention, I claim:

1. A dipper for attaching a minnow to a fish hook, comprising:
   a support having a handle, and an opening for receiving a minnow;
   a net of a flexible mesh material formed in the shape of a bag having an opening attached about the opening of the support; and
   a pair of cooperating jaws carried in the bottom of the bag when in a scooping position to receive a minnow being received through the support opening to support the minnow for attachment with a fish hook, the jaws being moveable with the bottom of the bag through the support opening to an inverted position so as to dispose the jaws outside the bag for attaching a hook through the minnow mounted between the jaws.

2. A dipper as defined in claim 1, in which the jaws include an opening for receiving a fish hoop being attached to the minnow.

3. A dipper as defined in claim 1, in which the jaws include an opening for receiving a hook into the minnow by a motion parallel to the motion of the jaws from their open toward their closed positions.

4. A dipper as deinfed in claim 1, in which one of the jaws is elongated so as to receive the minnow in a position parallel to the length of the jaw, and including a plurality of transverse openings along the length of the jaw for receiving the fish hook in a selected position in the minnow.

* * * * *